United States Patent Office 3,457,979
Patented July 29, 1969

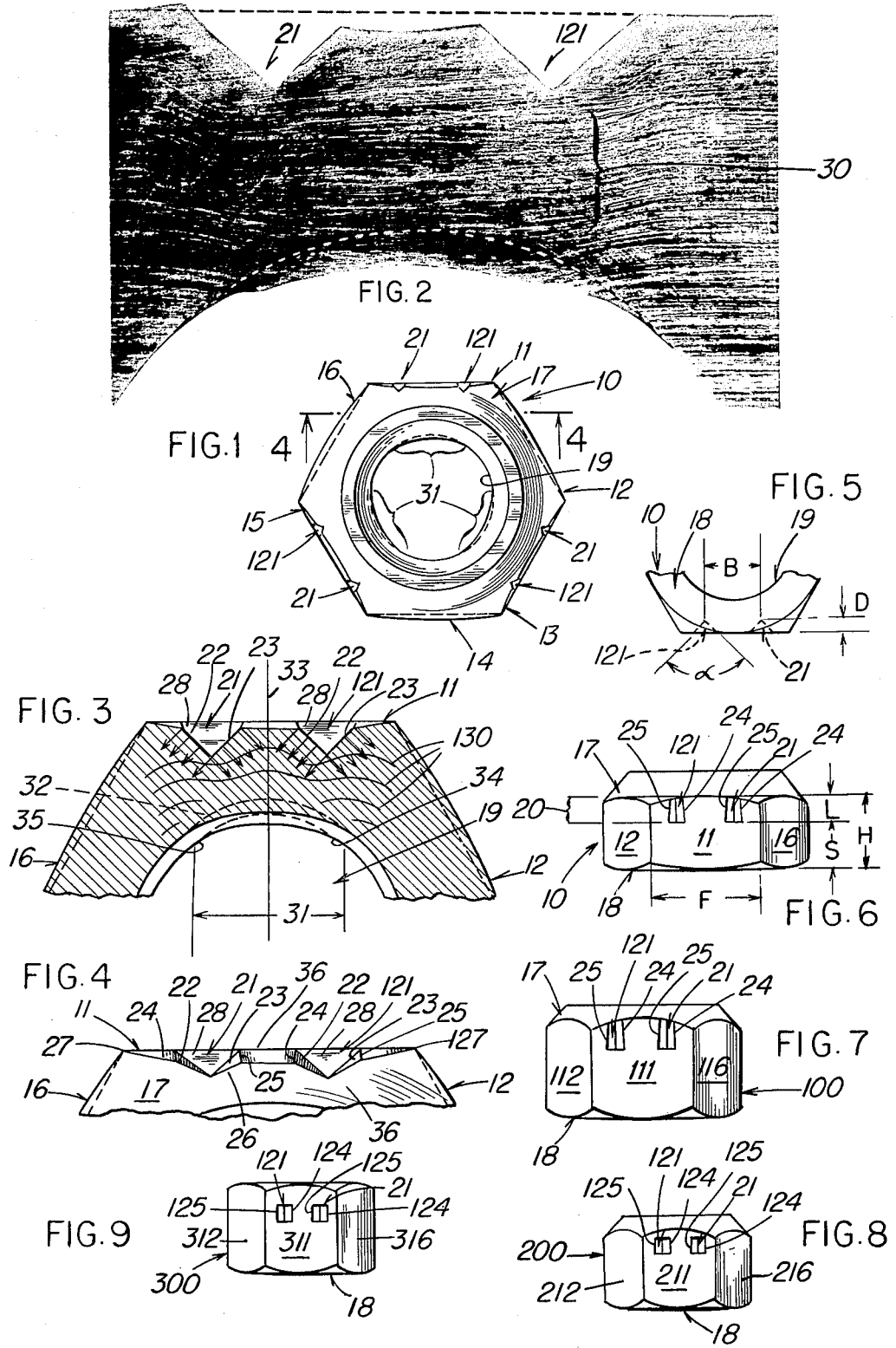

3,457,979
PREVAILING TORQUE LOCKNUT
John N. Munro, Fort Wayne, Ind., assignor, by mesne assignments, to Heli-Coil Corporation, Danbury, Conn., a corporation of Delaware
Filed Jan. 29, 1968, Ser. No. 701,153
Int. Cl. F16b 39/28; B21d 53/24
U.S. Cl. 151—21        7 Claims

ABSTRACT OF THE DISCLOSURE

A prevailing torque locknut in the form of a polygonally shaped nut body having base and top ends, a central threaded bore extending upwardly from the base end, and a base section provided with a plurality of longitudinally-extending side flats arranged about the threaded bore with the base section including a transverse locking zone axially spaced from the base end sufficiently to provide adjacent the latter a plurality of thread turns of normal diameter for free running engagement upon a threaded bolt. At least one of these side flats is provided with a pair of transversely-aligned V-shaped formed indentations within the transverse locking zone each having transversely-spaced side edges and an intervening bottom junction of the identation side faces all extending longitudinally, the outer side edges of the pair of indentations in this flat being located wholly within the area of the face of the latter. The pair of indentations in this flat are defined on their radially inner sides by a common, transversely-wide curvilinearly concaved thread area of the bore which is displaced radially inward of the normal thread diameter to a progressively lesser degree on opposite lateral sides of the center of this area with gradual mergence at its lateral margins into the flanking thread areas for smooth locking interference with the thread of a symmetrical male member threadably mounted in this locknut.

A general object of the present invention is to provide the indentation improvement of the present invention in a form which will permit easy and simple formation thereof with assured attainment of the desired results. Other more specific objects will be apparent from the following indications of advantageous characteristics of embodiments of the prevailing torque locknuts of the invention.

In accordance with the present invention polygonal nut bodies of ferric or non-ferric metallic material have at least one side flat thereof provided with a W or V—V indentation wholly within the side margins of this flat and arranged in a locking zone extending transversely relative to the bore axis, with attendant distortion beyond the elastic limit of the body metal. Such a pair of V-shaped indentations is defined on their radially inner sides by a common and transversely-wide, curvilinearly concaved thread area of the bore which is displaced radially inward of the normal thread diameter to a progressively lesser degree on opposite lateral sides of the center of this area with gradual mergence at its lateral margins into the flanking thread areas for smooth locking interference with a mating male thread. It is particularly advantageous to provide such indention in the alternate flats of hexagonal nut bodies within a transverse locking zone and with the intervening flats being unindented, so as symmetrically to triangulate the threaded bore in the transverse locking zone with gradual transverse transition between distorted thread areas and adjacent relatively undistorted thread areas, to form a desirable directional or non-directional locknut.

Such indention also causes gradual regression of thread area distortion in an axial direction away from the site of maximum distortion radially inward of the idention. The resulting gradual axial misalignment of the turns of the nut thread desirably provides additional resistance to rotation of a mating male thread.

Consequently, the areas of the locknut thread which are distorted for interference with the mating male thread are unusually large to assure an exceptionally good locking action while increasing the ability of the locknut to accommodate greater variations in tolerance and surface finish. Also, the unusually large areas of thread interference, while avoiding sharp transition thereof with adjacent thread areas, decreases materially the load or stress per unit area so as desirably to minimize wear of metal to metal surfaces or abrasion with assurance of adequate, long lasting prevailing torque.

This particular paired indention of alternate nut flats produces flow of the nut metal in normal directions away from the oblique side faces or sidewalls of the V-shaped indentations, so that such flow away from the lateral outer side faces or sidewalls of the pair thereof convexes the intervening unindented flats to an exceptional degree. The resulting deflection of the whole nut frame beyond the elastic limit of the nut material produces a unique beam action that allows long sustained locking action within the elastic limit of the nut material due to this and the decreased wear between the mating threads as a result of the unusually low stress per unit area. This is particularly advantageous with respect to hexagonal nut bodies wherein the nut frame is triangulated by the present indentation. The force of effecting the W or V—V indention of each alternate flat is directed at two locations which straddle the tangent point, and the attendant displacement of areas of the threaded bore produces a triangulation thereof within the locking zone that is characterized by gradual transverse transition from each of the three inwardly deflected areas to the next. With all six walls of the hexagonal nut frame being deformed in the indicated manner, so that the set of three indented alternate flats are uniformly deflected inwardly and the remaining set of three intervening flats are uniformly convexed outwardly to provide a symmetrical locknut frame, the latter maintains an unusual constant locking torque on threaded male members or bolts which are out of round or ovalized. The characteristics of such hexagonal locknuts permit, before this indention deflection, tapping the blanks slightly oversize while assuring satisfaction of gaging requirements, and a desired realization of good alignment between the threads of these finished locknuts and those of mating bolts. Also, these locknuts allow excellent accommodation of tolerances on bolts which are of questionable tolerances.

Further objects of the invention will in part be obvious and will in part appear from reference to the following detailed description taken in connection with the accompanying drawing, wherein like numerals identify similar parts throughout, and in which:

FIG. 1 is a top plan view to enlarged scale, of a hexagonal locknut of the open top crown type of the present invention;

FIG. 2 is a reproduction of an enlarged photomicrograph of a section of steel bar having a bore therethrough to simulate the bore of a nut and showing a side flat or face provided with a V—V indentation of the present invention, and it shows the flow of metal that takes place in providing flats of a nut frame with such a pair of V—V indentations;

FIG. 3 is an enlarged transverse sectional view, with parts broken away, of a nut frame of the type shown in FIG. 1, illustrating the metal flow shown in FIG. 2 and indicating by arrows the force applied to the body material by the indention of one of the side flats with attendant convexing of the faces of the flanking side flats, and further illustrating a displacement of the nut metal radially inward of the indentations to provide a common, transversely-wide, curvilinearly concaved thread area of the bore to a progressively lesser degree on opposite lateral sides of the center of this area with gradual mergence at its lateral margins into the flanking thread areas;

FIG. 4 is a top plan view to enlarged scale of a portion of the locknut shown in FIG. 1 beyond a line of breakaway substantially along line 4—4 thereof;

FIG. 5 is a diagrammatic illustration from the bottom end of a portion of a hexagonal nut body indicating that one of the flats thereof is to be provided with the pair of indentations of the present invention and indicating therein certain dimensional relationships thereof;

FIG. 6 is a diagrammatic illustration of a side elevation of the type of locknut shown in FIG. 1 to identify further dimensions for illustrative purposes;

FIG. 7 is a side elevational view of a locknut similar to that shown in FIG. 1 which provides a showing for comparison with that of FIG. 7 with respect to nut height and location of the pair of indentations relative to the nut base;

FIG. 8 is a side elevational view of an additional locknut of the open top crown type indicating the variation of the indention of a flat thereof to provide locking in a transverse zone more centrally located than that illustrated in FIGS. 6 and 7; and FIG. 9 is a view similar to FIG. 8 of a conventional nut body which is not of the crown type that may be provided with the indention of the type illustrated in FIG. 8.

The locknut 10 of FIG. 1 is of the hexagonal type, having side flats 11, 12, 13, 14, 15 and 16. The top end 17 of the nut frame 10 is crowned in conventional manner as will be more clearly understood from FIGS. 6 and 7. The opposite base end of the locknut 10 is also of conventional form, such as that indicated at 18 in FIGS. 5 to 9 incl. The nut frame 10 is provided with a suitable internally threaded axial bore 19 which, prior to the indentation procedure of the present invention, will be of symmetrical, circular cross-section.

Each of the alternate flats 11, 13 and 15 is provided within a transverse locking zone, such as that indicated at 20 in FIG. 6, with a pair of V-shaped formed indentations 21 a dn121 which are alike except for location.

Each of these punch indentations 21 and 121 is of a longitudinal length greater than the pitch of the thread of the internally threaded bore 19. As will be better understood from FIGS. 3 and 4, each of the punch indentations 21 and 121 has transversely spaced, angularly related sidewalls 22 and 23 terminating in the face of the flat 11 (or 13, or 15) in side edges 24 and 25, and an intervening bottom junction 26 of these sidewalls which extends longitudinally of the flats in which it is formed. It will be further noted from FIGS. 3 and 4 that the V-shaped punch indentations 21 and 121 are located wholly within the area of the face of the flat in which they are formed and are spaced appreciably inward from the longitudinal meeting side edges 27 and 127 of this flat and of the flats 16 and 12 flanking it. The bottom ends 28 of the indentations 21 and 121 in the alternate flats 11, 13, and 15, are generally aligned transversely in the bottom portion of the transverse locking zone 20.

By reference to FIG. 2 it will be seen from the flow lines, such as those indicated at 30 of the pattern of granular construction, that those indicated at 130 in FIG. 3 are a fairly accurate simulation thereof. In forming the V-shaped indentations 21 and 121 in a flat of the nut frame, pressure is applied to the frame metal substantially normal to the side faces 22 and 23, as is indicated by the arrows in FIG. 3, to cause such flow. As a result, the pair of V-shaped indentations 21 and 121 are defined on their radially inner sides by a transversely-wide, curvilinearly concaved thread area 31 of the bore 19 which is displaced symmetrically inward of the normal thread diameter, indicated in dotted lines at 32, to a progressively lesser degree on opposite lateral sides of the longitudinal center line 33 of the flat in which they are formed, with gradual mergence at 34 and 35 into the flanking thread areas located radially inward of the unindented flats 12 and 16, so as to provide smooth locking interference with the thread of a symmetrical male member when the latter is threadably mounted in such locknut.

It will be noted from FIGS. 1, 3 and 4, that within the transverse locking zone in which the pairs of V-shaped indentations 21 and 121 are formed, the indented flats 11, 13 and 15 are slightly concaved while the intermediate unindented flats 12, 14 and 16 are slightly convexed in this zone by the metal flow induced by the punching operation to effect such indentations. Within this concavity of the indented flats 11, 13 and 15 each pair of the V-shaped indentations 21 and 121 is intervened by a central, substantially flat face section 36. The areas of the flats below the transverse locking zone to the base end remain substantially flat. When, as may be preferred in the production of open top crown locknuts of the present invention, the V-shaped indentations 21 and 121 are provided as close to the top end of the nut as is possible the top end of the threaded bore 19 is desirably-triangulated by the inwardly displaced thread areas 31 to provide the desired smooth locking interference thereat. At the same time, the areas of the threaded bore 19 below the locking zone in the undeformed base section provide a plurality of undistorted thread turns which permit free running engagement with the theads of a male member.

It will be noted from FIGS. 6 and 7 that in providing a pair of V-shaped indentations 21 and 121 in the flats 11 and 111 of the nut frames 10 and 100, transversely-spaced side edges of the sidewalls of these indentations appear to converge slightly in the upward direction. This tendency to converge has been exaggerated for ready observation and it results from the fact that these indentations extend up into the crown area where the frame is weaker and will thus deform inwardly to a greater degree during the forming operation. Preferably, the punch is directed substantially normal to the bore axis in forming these V-shaped indentations. As contrasted therewith it will be noted from FIGS. 8 and 9 that in providing such indentations in flats 221 and 311 of nut frames 200 and 300 below any such more flexible top zone, the side edges 124 and 125 of the indentations 21 and 121 are substantially parallel.

The present invention may be practiced to advantage in the production of various types of prevailing torque locknuts. For example, open top crown locknuts having hexagonal nut frames have proven to be particularly desirable when the W and V—V indentations of the present invention are applied thereto in transverse locking zones located appreciable distances from the base end to provide a number of free running thread turns preceding the locking zones for easy starting. This is especially true when such indentions are provided in the side flats as near the crown as is possible to triangulate the top end of the threaded bore. Such advantages are also realized when the present indentions are embodied in polygonal nut bodies, such as those of the hexagonal nut frame type, to product cap locknuts, and others of otherwise conventional design in which locking indentations are provided in generally central zones. It has been found that this obtains even when about the worst conditions possible exist, such as when the locknut bodies are of relatively soft iron and are employed on heat treated bolts.

As are indicated in FIGS. 5 and 6 various dimensions of the V-shaped punch indentations of the present invention and of their proven advantageous locations may be identified as follows.

The angle between the sidewalls of each V-shaped indentation is $\alpha$.

The separation distance between the bottom junctions of these side faces for the pair of W or V—V indentations is $\beta$.

The depth of each indentation is D.

The indent length is L.

The height of the side flats, that constitutes the nut heights, is H.

The distance between the base end and the bottom ends of the indentations is S.

The cross flats dimension is F.

The requirements of the present invention are satisfied when the sidewalls of each punch indentation are substantially planar and the angle $\alpha$ is about ninety degrees (90°) but this angle may be varied acutely or obtusely within reasonable limites. The separation distance $\beta$ may be about thirty-seven to thirty-eight percent (37%–38%) of the normal nut size. However, this dimension may be varied to satisfy different conditions or configurations such as jam, heavy light service nuts or special series such as clinch or weld nuts which have other than standard configurations. Generally speaking, the distance S from the nut base to the bottom ends of the indentations for open top crown hexagonal locknuts may approximate about two-thirds of the nut height, and usually it is about 0.43 times the nominal nut size. For hexagonal locknuts wherein the indention is located in a generally central zone, S may be equal to about one-half of the nut height H minus the indent length L.

The indent depth D is, generally speaking, a function of the nominal nut size $D_n$, across flats dimension F type of nut, the material thereof, pitch of the thread and the required locking torque. Thus $$D = f(D_n \times F \times K)$$

where K is a constant relating nut material, thread pitch, locking torque and type of nut. The depth of penetration may be assumed to vary directly with the nut size $D_n$ on standard series nuts whose wall thickness to nominal hole diameter ratio is in the area of 0.25, and the across flats dimension F, so that $$D = D_n \times F \times K$$

Calculations of the constant K for a number of nuts has been determined, e.g., 7/16–20 UNF; 1/2–13 UNC; and 1/4–20 nuts. All of these nuts were made from conventional nut material of low carbon, resulphurized, scrapless nut quality steel that was not heat treated. The following table sets forth the various values determined for and by the above formula.

| Dn | D | K |
|---|---|---|
| 7/16 | [1].038 | .117 |
| 1/2 | [1].040 | .100 |
| 1/4 | [2].033 | [3].415 |

[1] These indentation depths determined for special weld nuts.
[2] This indentation depth determined for standard finished full crown locknuts.
[3] Average K factor for five nuts which is relatively high due to the ratio of wall thickness to hole diameter for these full crown locknuts.

Equally good results have been obtained for nuts made from heat treated, medium carbon nut quality steel, and for nuts made from non-ferric nut metallic material, such as brass. Heat treated medium carbon steel does not require as deep a penetration of the indentations as does non-heat treated low carbon steel.

The forming equipment includes a base plate located opposite a pressure driven forming tool to perform the indention. A flat of the hexagonal nut that is not to be indented is rested on this base plate with proper alignment to present the diametrically opposite flat to the tool for indention. The tool may have its tip shaped to form the pair of indentations simultaneously. If the indention is to be of the W type the inside flanking faces of the V-shaped indenting wedges, which are nearest each other, will have a common meeting line between the wedges; and if it is to be of the V—V type these faces are intervened by a transverse flat face section. Such an intermediate flat face section may be relied upon to limit the indenting depth with greater accuracy than if the wedges are immediately adjacent to provide an intervening V into which the nut metal may flow during the forming operation. Such flow is particularly characteristic of soft nut metal.

Such locknuts of the present invention achieve their prevailing torque by the shape and design of the forming or indenting tools which by their configurations cause the ferric or non-ferric metals to flow in a uniform and controlled manner that causes smooth deformation of the locking threads in a curvilinear concave area, which is unique in generally accepted deflecting practice in the art of producing prevailing torque locknuts. Consequently, the present locknuts sustain prevailing torque over an unusually long period of service and for unusually large numbers of repeated installations and removals due to the exceptionally low stress per unit area of the deformed areas of the threaded bores and the exceptionally large areas of thread wear created by the deformation interference. Further, the deformation interference created by the present invention retards galling during such repeated installations and removals to a degree that is unusual in the prevailing torque locknut art.

Since certain changes may be made in the above article without departing from the scope of the invention, it is intended that all matter contained in the above description and shown in the accompanying drawing shall be interpreted as illustrative and not in a limiting sense.

I claim:

1. A prevailing torque locknut comprising a polygonal nut body having base and top ends, a central threaded bore extending from the base end at least an appreciable distance toward the top end, and a transversely-symmetrical base section provided with an even-numbered plurality of longitudinally-extending side flats at least four in number arranged about the threaded bore and spaced substantially equally from the axis of the latter, the nut body base section including a transverse locking zone axially spaced sufficiently from the body base end as to retain adjacent the latter a plurality of thread turns of normal diameter for free running initial engagement, wherein the improvement comprises a plurality of pairs of V-shaped punch indentations provided in alternate ones of said side flats within the transverse locking zone and with those of each pair having base ends which are generally aligned transversely, each of said alternate side flats containing one of said pair of V-shaped punch indentations with no other punch indentation intervening the V-shaped indentations of each such pair thereof and with the side flats intervening said punched alternate flats being free of punch indentations, each said V-shaped punch indentation being of a length greater than the pitch of the thread and having transversely-spaced side edges and an intervening bottom junction of the indentation side faces all extending longitudinally of the flat in which it is formed with the outer side edges of the pair of indentations in the latter indented flat located wholly within the area of the face of this indented flat and spaced appreciably inward from the longitudinal meeting side edges of this flat and of the intervening unpunched flats flanking it, each of said V-shaped indentation pairs being defined on their radially inner sides by a transversely-wide curvilinearly concaved thread area of said bore which is displaced symmetrically radially inward of the normal thread diameter to a progressively lesser degree on opposite lateral sides of the longitudinal center line of the flat in which they are formed with gradual mergence into the flanking thread areas located radially inward of the unindented flats for smooth locking interference with the thread of a symmetrical male member threadably mounted in said locknut.

2. The locknut as defined in claim 1 wherein the lateral outer sidewalls of the pair of V-shaped indentations in any particular one of the nut side flats are arranged on opposite sides of and at oppositely directed appreciable oblique angles to a straight line extension of a diameter of said nut bore which intercepts the longitudinal center line of this indented flat with these indentation outer sidewalls converging toward each other radially inward of the nut body and with each thereof being arranged generally normal to the adjacent portion of the nut sector that is located radially inward of the adjacent unindented flat whereby the faces of the flats intervening the indented flats are slightly convexed transversely within the transverse locking zone by flow of the nut body material as said punched indentations are formed.

3. The locknut as defined in claim 1 wherein the punch indentations of each pair have their inner opposed side edges spaced transversely and intervened by a longitudinally-extending central portion of the face of the side flat in which they are formed with this central face portion extending crosswise of said locking zone and being slightly depressed radially inward from the plane of the face portions of this indented flat flanking at least the base side of said zone.

4. The locknut as defined in claim 1 wherein the punch indentations of each pair have their inner opposed side edges juxtaposed in a common intervening ridge that extends longitudinally crosswise of said locking zone with said ridge being slightly depressed radially inward from the plane of the face portions of the flat in which they are formed that flank at least the base side of said zone.

5. The locknut as defined in claim 2 wherein the longitudinal sidewalls of each punch indentation are substantially planar and define an angle therebetween of the order of about 90°.

6. The locknut as defined in claim 5 wherein the sidewalls of each indentation are arranged at generally equal angles to the flanking face portions of the flat in which they are formed.

7. The locknut as defined in claim 1 wherein the nut body is of the hexagonal type with every other one of its side flats being provided with one of said pairs of indentations, whereby each indented side flat is diametrically opposed to one of the unindented side flats and said threaded bore is triangulated in the locking zone.

References Cited

UNITED STATES PATENTS 675,740   6/1901   Keen.
3,029,856  4/1962   Abbott.

CARL W. TOMLIN, Primary Examiner
RAMON S. BRITTS, Assistant Examiner

U.S. Cl. X.R.
10—86